United States Patent [19]
de Weerd

[11] Patent Number: 5,998,887
[45] Date of Patent: Dec. 7, 1999

[54] BATTERY TEST CIRCUIT FOR OPTICAL NETWORK AND METHOD OF OPERATION THEREOF

[75] Inventor: Jan de Weerd, Huizen, Netherlands

[73] Assignee: Lucent Technologies, Inc., Murray Hill, N.J.

[21] Appl. No.: 09/099,001

[22] Filed: Jun. 17, 1998

[51] Int. Cl.[6] ............................................. H02J 7/00
[52] U.S. Cl. ...................... 307/66; 320/134; 320/127; 320/128
[58] Field of Search ............................ 307/64–66, 80, 307/82; 324/511; 320/118, 162, 163, 165, 137, 135, 127, 128, 134

[56] References Cited

U.S. PATENT DOCUMENTS

| | | | |
|---|---|---|---|
| 3,778,634 | 12/1973 | Hanrihan | 307/64 |
| 4,038,559 | 7/1977 | Chun | 307/64 |
| 5,182,518 | 1/1993 | Stich et al. | 307/66 |
| 5,253,110 | 10/1993 | Ichihara et al. | 359/619 |
| 5,288,996 | 2/1994 | Betzig et al. | 250/227.26 |
| 5,458,991 | 10/1995 | Severinsky | 307/66 |
| 5,479,252 | 12/1995 | Worster et al. | 356/237 |
| 5,483,463 | 1/1996 | Qin et al. | 364/492 |
| 5,532,873 | 7/1996 | Dixon | 359/388 |
| 5,670,833 | 9/1997 | Mengelt | 307/66 |
| 5,751,564 | 5/1998 | Dien | 363/37 |
| 5,856,712 | 1/1999 | Suzuki | 307/64 |

Primary Examiner—Jeffrey Gaffin
Assistant Examiner—Peter Zura

[57] ABSTRACT

A battery backed-up power supply and a method of operating the same to test a battery therein. In one embodiment, the power supply includes: (1) a transformer having a main power primary winding, an auxiliary power primary winding and a secondary winding, (2) a main power converter, coupled to the main power primary winding, that provides main power received from a main power source to the main power primary winding and (3) an auxiliary power converter, coupled to the auxiliary power primary winding, that provides auxiliary power received from a battery to the auxiliary power primary winding when the main power source is interrupted and is further selectively activatable while the main power source is operational to discharge the battery through the transformer and thereby test the battery.

18 Claims, 2 Drawing Sheets

BATTERY TEST CIRCUIT FOR OPTICAL NETWORK AND METHOD OF OPERATION THEREOF

TECHNICAL FIELD OF THE INVENTION

The present invention is directed, in general, to power supplies and, more specifically, to a battery backed-up power supply for an optical network that contains a battery test circuit and method of operating the same to test a battery.

BACKGROUND OF THE INVENTION

Power converters commonly used in optical networks convert AC or DC input power to DC output(s) frequently have multiple outputs that are often derived from multiple transformers within the converters. In converters employing multiple transformers, DC power is commonly derived as a first stage converts commercial AC power into DC power by using an AC/DC converter. Once converted, the power is manipulated in a second stage by a DC/DC converter. This secondary conversion further conditions the power resulting in multiple voltage outputs. Such outputs commonly include voltage values of +5V, +3.3V, −48V and a variable return voltage.

Additionally, typical power converters include a battery backup stage that operates as an alternate power source when commercial AC power fails. The battery backup stage is coupled to both the AC/DC stage and the DC/DC stage. During normal operation, when commercial AC power is online, the battery backup stage operates in a charging mode, where the AC/DC converter supplies power to maintain the charge. When AC power fails, the battery backup stage switches to a discharge mode to supply power from one or more backup batteries to the optical network.

As those skilled in the art are aware, the backup batteries are routinely discharged for testing purposes to ensure performance when needed. Commonly, one battery (the "battery under test") is coupled at a time to a load that dissipates energy supplied to it by the battery under test. In systems using multiple battery backups, one battery is discharged while others remain in a continually charging mode, prepared to supply DC power to the load in case of main power failure.

Unfortunately, when the batteries are discharged through these loads, great amounts of power are wasted. Usually, the energy dissipated appears as heat radiated from the load. Not only is the heat emitted wasteful, it may also be harmful. The traumatic nature of this discharge commonly damages the load and reduces its overall lifetime. Should the load suffer a critical breakdown, the system as a whole could be damaged or destroyed. Additionally, heat generated can possible damage other components in the system or pose a fire hazard to equipment and buildings located in proximity.

Accordingly, what is needed in the art is a power supply which is capable of discharging and testing backup batteries in a manner that is less wasteful and less offensive to the environment.

SUMMARY OF THE INVENTION

To address the above-discussed deficiencies of the prior art, the present invention provides a battery backed-up power supply and a method of operating the same to test a battery therein. In one embodiment, the power supply includes: (1) a transformer having a main power primary winding, an auxiliary power primary winding and a secondary winding, (2) a main power converter, coupled to the main power primary winding, that provides main power received from a main power source to the main power primary winding and (3) an auxiliary power converter, coupled to the auxiliary power primary winding, that provides auxiliary power received from a battery to the auxiliary power primary winding when the main power source is interrupted and is further selectively activatable while the main power source is operational to discharge the battery through the transformer and thereby test the battery.

The present invention therefore introduces the broad concept of putting to use the energy that is normally wasted while a battery is being discharged as part of its testing. The present invention employs a transformer having multiple primary windings to allow the main power source and the battery being tested to provide power to a load concurrently. In an embodiment to be illustrated and described, a switching circuit is employed to activate the auxiliary power converter and couple the battery accordingly.

In one embodiment of the present invention, the power supply further includes a charge controller, coupled to the secondary winding, that provides DC power to charge the battery. In the embodiment to be illustrated and described, the battery is decoupled from the charge controller while it is being discharged, whether in the absence of main power or being tested.

In one embodiment of the present invention, the battery is a first battery and the power supply further comprises a charge controller coupled to a second battery, the charge controller providing DC power to charge the second battery while the auxiliary power converter discharges the battery through the transformer. In the embodiment to be illustrated and described, multiple batteries are employed. The battery not being tested can still be charged. Of course, this need not be the case.

In one embodiment of the present invention, the auxiliary power converter fully discharges the battery. Alternatively, the battery can be tested by only partially discharging it, either for a given amount of time or to a given charge level.

In one embodiment of the present invention, the secondary winding is coupled to a main load having a current capacity, the power supply further comprising a controlled load, couplable to the secondary winding, that receives current exceeding the current capacity. The controlled load, which is not necessary to the present invention, advantageously prevents the load from accepting too much power and being damaged as a result.

In one embodiment of the present invention, the power supply further includes an integrated controller, coupled to the main and auxiliary power converters, that employs a common voltage reference in developing control signals therefor. An integrated controller to be illustrated and described employs a resistor ladder driven by a single reference to develop necessary intermediate signals.

In one embodiment of the present invention, another secondary winding provides about −48 volts. Such voltage is useful in, for example, optical network units. Other converters may be coupled to the secondary winding or to other secondary windings to derive further power of other voltages from the transformer. The present invention is not limited to a particular output voltage or set of output voltages.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
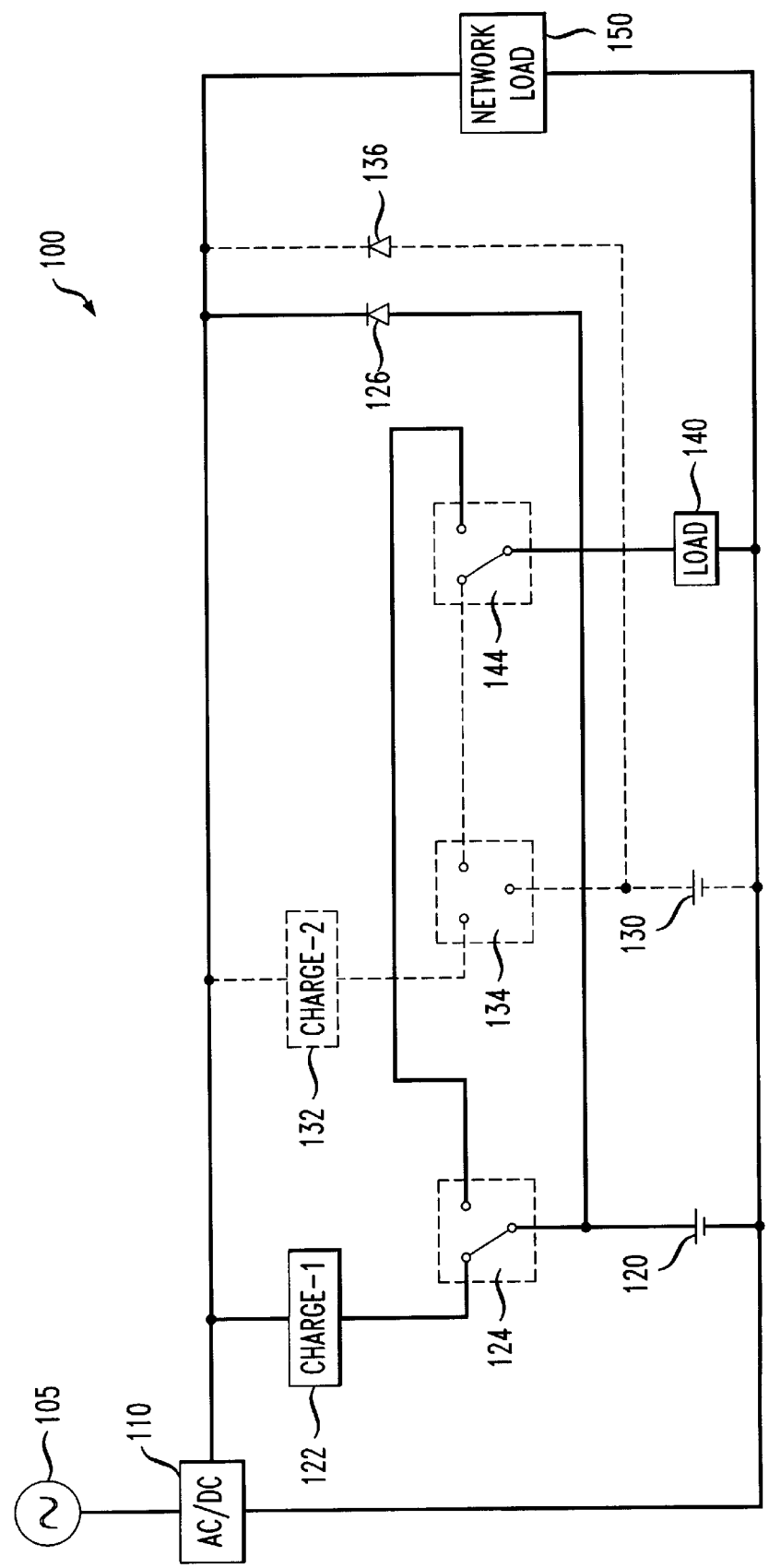
FIG. 1 illustrates a schematic diagrams of a prior art battery backed-up power supply.

Referring initially to FIG. 1, illustrated is a schematic diagrams of a prior art battery backed-up power supply, generally designated 100. The power supply 100 includes a AC/DC converter 110 that receives AC power from an AC power source 105 and delivers converted DC power to a network load 150. A first battery charger 122 is coupled across the output of the converter 110 and to a first battery 120. The first battery 120 may be decoupled from the first battery charger 122 and coupled to a dissipative load 140 by way of a first switch 124. Finally, a first diode 126 is coupled between the first battery 120 and the network load 150.

A second battery charger 132, a second battery 130, a second switch 134 and a second diode 136 are coupled to the converter 110 in the same fashion as the first charger 122, the first battery 120, the first switch 124 and the first diode 126. A third switch 144 is coupled to the dissipative load 140, allowing selective coupling of a single battery under discharge. In other embodiments, and according to requirements of a particular application, the power supply 100 may include more or fewer batteries.

During normal operation, the AC power source 105 supplies power to the converter 110, which then supplies conditioned power to the network load 150 and to the first and second chargers 122, 132. The first and second chargers 122, 132 employ the energy to maintain the charge on the first and second batteries 120, 130. In a situation where the AC power source 105 fails, the first and second batteries 120, 130 supply power to the network load 150 until such time as AC power is restored.

Periodically, the first and second batteries 120, 130 are discharged or "tested" to maintain their efficiency. The first, second and third switches 124, 134, 144 are operated by a controller (not shown) in such a way that the first and second batteries 120, 130 are tested one at a time. When the first battery 120 is tested, the current flows from the first battery 120 through the first and third switches 124, 144 to the dissipative load 140. While the first battery 120 is tested, the second battery 130 charges. In embodiments containing only the first battery 120, the third switch 144 is omitted, as the dissipative load 140 may be connected direct via the first switch 124.

Figure 2:
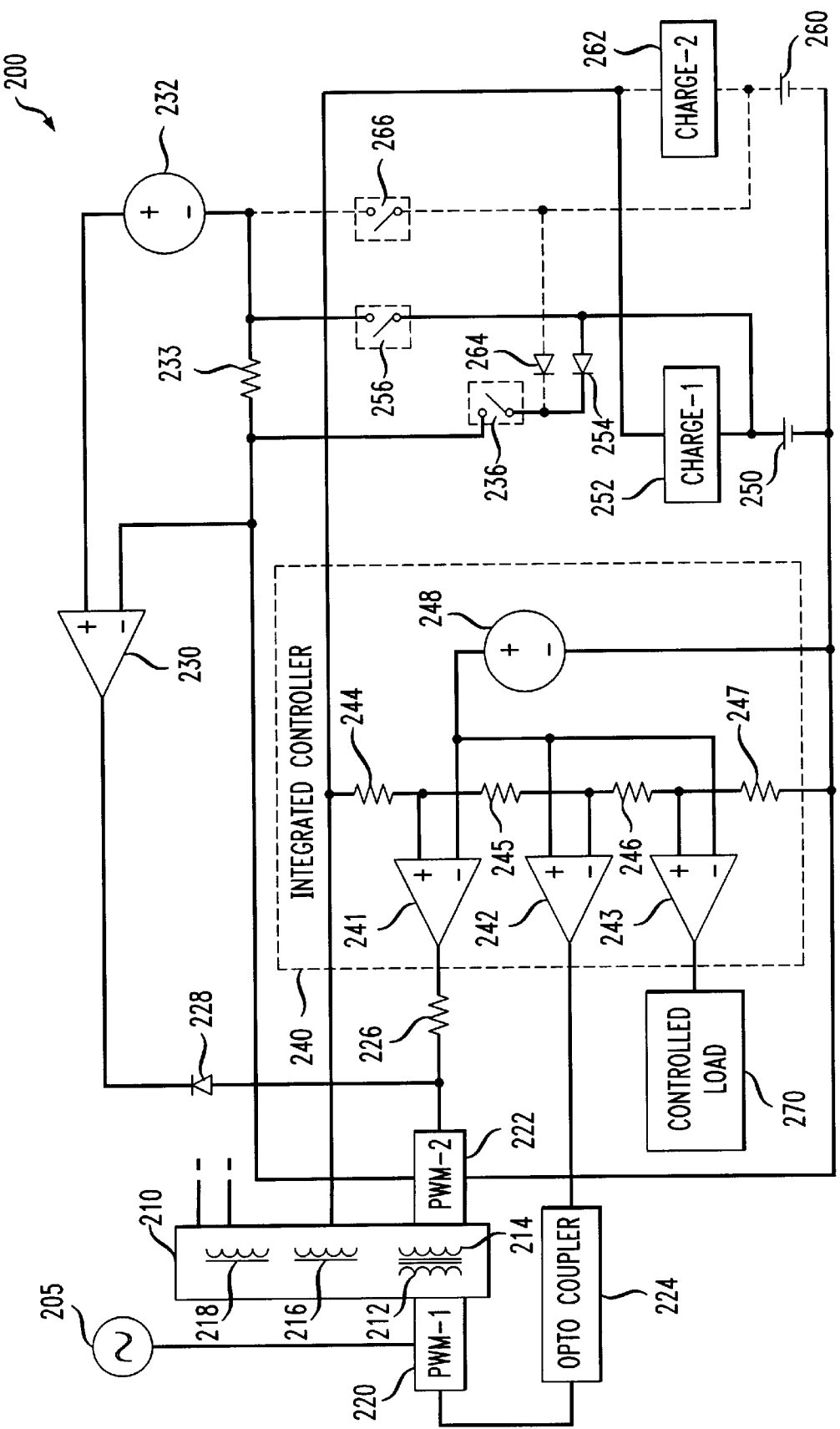
FIG. 2 illustrates a schematic diagram of a battery backed-up power supply constructed according to the principles of the present invention.

Turning now to FIG. 2, illustrated is a schematic diagram of a battery backed-up power supply, generally designated 200, constructed according to the principles of the present invention. The power supply 200 includes a transformer 210 having a main power primary winding 212, an auxiliary power primary winding 214 and first and second secondary windings 216, 218. A main power converter 220 converts (i.e., rectifies and smooths) AC power received from an AC power source 205 into usable DC power. That converted DC power is then delivered to the main power primary winding 212. An auxiliary power converter 222 is coupled to the auxiliary power primary winding 214 to deliver DC power received from a first or second battery 250, 260 when AC power is interrupted or when one of the batteries 250, 260 is discharged during testing. In a preferred embodiment, the converters 220, 222 are pulse-width modulated (PWM) converters. The converters 220, 222 receive control signals from an integrated controller 240. An opto-coupler 224 is coupled between the main power converter 220 and the integrated controller 240 while a signal resistor 226 is coupled between the auxiliary power converter 222 and the integrated controller 240.

The first secondary winding 216 is coupled to first and second charge controllers 252, 262 to provide DC power to charge the first and second batteries 250, 260. Finally, the second secondary winding 218 supplies DC power for various outputs, as desired. In a preferred embodiment, the second secondary winding 218 provides −48 volts for use with various outputs, as desired.

The integrated controller 240 includes first, second and third operational amplifiers ("op-amps") 241, 242, 243 that deliver output signals to the auxiliary and main converters 222, 220 and a controlled load 270, respectively. First, second, third and fourth resistors 244, 245, 246, 247 are series-coupled to form a voltage divider (not separately referenced) that derives voltages necessary to control the op-amps 241, 242, 243. The noninverting input of the first op-amp 241 is coupled to the first resistor 244, the inverting input of the second op-amp 242 is coupled to the second resistor 245 and the noninverting input of the third op-amp 243 is coupled to the third resistor 246.

A first common voltage reference 248 supplies a voltage to the inverting input of the first op-amp 241, the noninverting input of the second op-amp 242 and the inverting input of the third op-amp 243. The various control signals are derived when this supplied voltage is compared with the voltage supplied to each op-amp 241, 242, 243 by the voltage divider.

A feedback diode 228 is coupled to the signal resistor 226 and to the output of a feedback op-amp 230. A second common voltage reference 232 is coupled to the noninverting input of the feedback op-amp 230 and to a feedback resistor 233. The feedback resistor 233 is then coupled to the inverting input of the feedback op-amp 230. Moreover, the auxiliary power converter 222 is coupled to the feedback resistor 233.

The first charge controller 252 charges the first battery 250 with power supplied by the first secondary winding 216. Additionally, the first battery 250 is coupled to a first diode 254 and to a first switch 256. The diode is further coupled to a third switch 236 which is, in turn, coupled to the auxiliary power converter 222. The first switch 256 is also coupled to the feedback resistor 233.

The second charge controller 262, the second battery 260, the second diode 264 and the second switch 266 are coupled together and to the third switch 236 and the feedback resistor 233 in the same fashion as the first charge controller 252, the first battery 250, the first diode 254 and the first switch 256.

When the first battery 250 is tested, the second common reference voltage 232 is activated (i.e. switched from 0V to a predetermined value), the first switch 256 is engaged to couple the first battery to the feedback resistor 233 and the third switch 236 decouples the normal path from the batteries 250, 260 to the auxiliary power converter 222. When the second common reference voltage 232 is activated, the output voltage of the feedback op-amp 230 is lower than the voltage across the signal resistor 226. As a result, the input voltage of the auxiliary power converter 222 drops below a predetermined threshold, activating the auxiliary power converter 222.

Once the auxiliary power converter 222 is activated, a current flows from the first battery 250 via the first switch 256 and the feedback resistor 233 to the auxiliary power converter 222. The current causes the voltage from the first secondary winding 216 to rise slightly, which, via the second op-amp 242, reduces the amount of power delivered by the main power converter 220. Due to feedback from the feedback op-amp 230 and the second common reference voltage 232, the current through the feedback resistor 233 stabilizes at a predetermined value. This formula characterizes the predetermined value:

$$V_{ref2}/R_f$$

where:

$V_{ref2}$=voltage of the second common voltage reference 248, and $R_f$=resistance of the feedback resistor 233.

When the test current from the first battery 250 results in an input power supplied to a network load (not shown) that exceeds the total required power (generally, the sum of the power required by the network load plus the internal losses of the power supply 200), the voltage supplied by the first secondary winding 216 rises accordingly. This rise automatically activates the third op-amp 243 to deliver excess power to the dissipative controlled load 270.

In such cases, only a small portion of the power delivered by the first battery 250 during testing is released through the controlled load 270. Under normal operating conditions, the power required by the network load is sufficient to utilize all of the supplied battery power.

While the first battery 250 is tested, the second battery 260 charges. Conversely, the first battery 250 may remain in a standby charging state while the second battery 260 is discharged in the same manner described previously. In other embodiments, according to application requirements, the power supply 200 may include more or fewer batteries.

Although the present invention has been described in detail, those skilled in the art should understand that they can make various changes, substitutions and alterations herein without departing from the spirit and scope of the invention in its broadest form.

What is claimed is:

1. A battery backed-up power supply, comprising:
a transformer having a main power primary winding, an auxiliary power primary winding and a secondary winding, said secondary winding being coupled to a main load having a current capacity;
a main power converter, coupled to said main power primary winding, that provides main power received from a main power source to said main power primary winding;
an auxiliary power converter, coupled to said auxiliary power primary winding, that provides auxiliary power received from a battery to said auxiliary power primary winding when said main power source is interrupted and is further selectively activatable while said main power source is operational to discharge said battery through said transformer; and
a controlled load, couplable to said secondary winding, and that receives current exceeding said current capacity while discharging said battery to test said battery.

2. The power supply as recited in claim 1 further comprising a charge controller, coupled to said secondary winding, that provides DC power to charge said battery.

3. The power supply as recited in claim 1 wherein said battery is a first battery and said power supply further comprises a charge controller coupled to a second battery, said charge controller providing DC power to charge said second battery while said auxiliary power converter discharges said first battery through said transformer.

4. The power supply as recited in claim 1 wherein said auxiliary power converter fully discharges said battery.

5. The power supply as recited in claim 1 further comprising an integrated controller, coupled to said main and auxiliary power converters, that employs a common voltage reference in developing control signals therefor.

6. The power supply as recited in claim 1 further comprising another secondary winding that provides about −48 volts.

7. A method of testing a battery in a battery backed-up power supply, comprising the steps of:
providing main power from a main power source to a main power winding of a transformer with a main power converter, said transformer further having an auxiliary power primary winding and a secondary winding, said secondary winding being coupled to a main load having a current capacity;
providing auxiliary power from a battery to said auxiliary power primary winding via an auxiliary power converter when said main power source is interrupted;
selectively activating said auxiliary power converter while said main power source is operational to discharge said battery through said transformer; and
receiving current exceeding said current capacity into a controlled load while discharging said battery to test said battery.

8. The method as recited in claim 7 further comprising the step of providing DC power to charge said battery.

9. The method as recited in claim 7 wherein said battery is a first battery and said method further comprises the step of providing DC power to charge a second battery while carrying out said step of selectively activating.

10. The method as recited in claim 7 wherein said step of selectively activating comprises the step of fully discharging said battery.

11. The method as recited in claim 7 further comprising the step of employing a common voltage reference in developing control signals for said main and auxiliary power converters.

12. The method as recited in claim 7 further comprising the step of providing about −48 volts from another secondary winding.

13. A battery backed-up power supply, comprising:
a transformer having a main power primary winding, an auxiliary power primary winding and a secondary winding, said secondary winding being coupled to a main load having a current capacity;
a main power converter, coupled to said main power primary winding, that provides main power received from a main power source to said main power primary winding;
an auxiliary power converter, coupled to said auxiliary power primary winding, that provides auxiliary power received from at least one of first and second batteries to said auxiliary power primary winding when said main power source is interrupted and is further selectively activatable while said main power source is operational to discharge a selected one of said first and second batteries through said transformer; and a controlled load, couplable to said secondary winding, and that receives current exceeding said current capacity while discharging said selected one to test said selected one.

14. The power supply as recited in claim 13 further comprising a charge controller, coupled to said secondary winding, that provides DC power to charge said first and second batteries.

15. The power supply as recited in claim 13 wherein said power supply further comprises a charge controller coupled to said second battery, said charge controller providing DC power to charge said second battery while said auxiliary power converter discharges said first battery through said transformer.

16. The power supply as recited in claim 13 wherein said auxiliary power converter fully discharges said selected one.

17. The power supply as recited in claim 13 further comprising an integrated controller, coupled to said main and auxiliary power converters, that employs a common voltage reference in developing control signals therefor.

18. The power supply as recited in claim 13 further comprising another secondary winding that provides about −48 volts.

\* \* \* \* \*